(12) United States Patent
Trivedi et al.

(10) Patent No.: US 7,500,083 B2
(45) Date of Patent: Mar. 3, 2009

(54) ACCELERATED PROCESSING WITH SCHEDULING TO CONFIGURED COPROCESSOR FOR MOLECULAR DATA TYPE BY SERVICE AND CONTROL COPROCESSOR UPON ANALYSIS OF SOFTWARE CODE

(75) Inventors: Hemant Vrajlal Trivedi, Cupertino, CA (US); Robert M. Keller, Edina, MN (US)

(73) Assignee: Silicon Informatics, St. Paul, MN (US)

( * ) Notice: Subject to any disclaimer, the term of this patent is extended or adjusted under 35 U.S.C. 154(b) by 148 days.

(21) Appl. No.: 11/204,233

(22) Filed: Aug. 15, 2005

(65) Prior Publication Data

US 2007/0038843 A1 Feb. 15, 2007

(51) Int. Cl.
*G06F 15/16* (2006.01)
(52) U.S. Cl. .............................. 712/34; 712/36; 712/37
(58) Field of Classification Search ........................ None
See application file for complete search history.

(56) References Cited

U.S. PATENT DOCUMENTS 5,655,131 A * 8/1997 Davies ........................ 712/34
5,675,751 A * 10/1997 Baker et al. ................. 710/305
6,925,641 B1 * 8/2005 Elabd .......................... 718/101

OTHER PUBLICATIONS

"PCT Application No. PCT/US06/30950, International Search Report", 4 pgs.
"PCT Application No. PCT/US06/30950, Written Opinion mailed Sep. 19, 2006", 7 pgs.

* cited by examiner

*Primary Examiner*—Kenneth S Kim
(74) *Attorney, Agent, or Firm*—Shwegman, Lundberg & Woessner, P.A.

(57) ABSTRACT

An accelerated processing system includes one or more conventional processors, one or more coprocessors, and high speed data links between the processors, coprocessors and memory. In an embodiment, an application program is compiled and linked to a library of macros, the macros are invoked at run time by the application program, the application program marks data to be processed by the one or more coprocessors. A service and control coprocessor streams the marked data to the one or more coprocessors for processing. In an embodiment, a coprocessor is configured to analyze software code and data, to schedule processing of the software code and data in another coprocessor, and to manipulate the data based on the type of data that the other coprocessor is configured to process.

48 Claims, 10 Drawing Sheets

$$\begin{bmatrix} \cos Y * \cos Z & \sin X * \sin Y * \cos Z - \cos X * \sin Z & \cos X * \sin Y * \cos Z + \sin X * \sin Z \\ \cos Y * \sin Z & \sin X * \sin Y * \cos Z + \cos X * \cos Z & \cos X * \sin Y * \sin Z - \sin X * \cos Z \\ -\sin Y & \sin X * \cos Y & \cos X * \cos Y \end{bmatrix}$$

ROTATION MATRIX

*FIG. 5*

OUTER LOOP:

```
For Each rotation_increment along X axis {
   For Each rotation_increment along Y axis {
      For Each rotation_increment along Z axis {
         Calculate Rotation Matrix ;
         For Each Translation_increment along X axis {
            For Each Translation_increment along Y axis {
               For Each Translation_increment along Z axis {
                  Generate new Ligand Coordinates;
                  Perform Inner Loop
               }
            }
         }
      }
   }
}
```

INNER LOOP:

```
For Each atom in Ligand
{
   For Each atom in Receptor
   {
      Calculate Energy Function E
   }
}
```

*FIG. 6*

| INPUT STREAMS | BASE ADDRESS | RECORD SIZE | LENGTH | OUTPUT STREAM | OPERATION | CONTROL STRUCTURE |
|---|---|---|---|---|---|---|
| A | 0x4ACB | 16 | 256 | F | SUM | 0xFCAB |
| C,D | 0x6CBD | 32 | 128 | Y | DISTANCE | 0xF98C |
| F,C | 0x576 | 16 | 128 | Z | ENERGY | 0CF7657 |
| ... | ... | ... | ... | ... | ... | ... |

*FIG. 11A*

| OPERATION | MODULE IDS | PIPELINES | MAP STRUCTURE ADDRESS | SCHEDULING VECTOR |
|---|---|---|---|---|
| SUM | 1,2,3,4 | 8 | 0x7890 | 0x0110 |
| DISTANCE | 1,2,3 | 4 | 0x6789 | 0x0110 |
| ENERGY | 2,3,4 | 8 | 0x6F89 | 0x0110 |
| | | | | |
| | | | | |

*FIG. 11B*

ACCELERATED PROCESSING WITH SCHEDULING TO CONFIGURED COPROCESSOR FOR MOLECULAR DATA TYPE BY SERVICE AND CONTROL COPROCESSOR UPON ANALYSIS OF SOFTWARE CODE

TECHNICAL FIELD

Various embodiments of the invention relate to the field of accelerated processing, and in particular, but not by way of limitation, to accelerated processing in a desktop environment.

BACKGROUND

Performance optimization and acceleration of software applications are highly desired and heavily pursued activities in many areas of computing. It is particularly desirable in business and scientific applications that involve highly complex and computationally intensive data processing needs. Business organizations gain a competitive advantage with such optimization and acceleration schemes by reducing costs, improving turn around times, and elevating the overall profitability and efficiency of the organization.

To increase the throughput of systems that handle complex and computationally intensive data processing problems, such systems have used homogeneous, conventional multiprocessors and/or cluster platforms. Consequently, the vast majority of software applications that have been developed for the scientific, financial, and other communities have been developed for these conventional processor based software machines. Software controlled conventional processor based machines provide great flexibility in that they can be adapted for many different purposes through the use of suitable software. Additionally, methodologies for developing software applications for these machines is well established and well understood by a large majority of professionals in the art of software application development.

However, scaling the number of conventional processors in homogeneous systems or platforms to reach high performance levels adds significant cost and dramatically increases the management complexity of the system, and in particular, its control and communication management. This typically leads to having specialized maintenance and operation requirements which are handled by a dedicated team of information technology professionals. For it is well known that as the number of conventional processors increases, the incremental benefit of adding additional processors decreases and can approach zero as the system management overhead begins to dominate.

While in some environments the flexibility of conventional processors is an advantage, the manner in which conventional processors are designed and constructed causes problems in other environments. Conventional processors are designed around a very limited number of fairly generic computational resources such as instruction and data caches, registers, arithmetic logic units, and floating point units. Conventional processors also typically have a fixed word size—e.g. 32 or 64 bits. These features of conventional processors cannot be changed or altered in a real time processing environment to fit the precise requirements of a given application. Consequently, a set of instructions and tools are provided to map application requirements onto the fixed number of available resources inside a conventional processor. This mapping limits application performance by various degrees depending on the quality of matching between available conventional processor resources and the ideal number and type of resources required by the application for optimal or peak performance.

To overcome these limitations of conventional processors, some systems have used coprocessors having a large number of highly specialized resources such as fast floating point units, flexible interconnects and pipelines, hardware multipliers and accumulators, and optimized math functions. Moreover, in many cases, such coprocessors provide the ability to adapt or dynamically change hardware circuits, interconnects, and/or bit lengths to meet the exact requirements of a particular application. Such techniques are common in the case of programmable logic devices such as Field Programmable Gate Arrays (FPGA).

A rather distinct difference between conventional processor systems with their generic computational resources and coprocessor systems having a large number of highly specialized resources is the speed at which they perform a function. Typically, for a given set of related functions, a software controlled conventional processor is usually significantly slower than a specialized processor or co-processor that is specifically configured to the desired functionality and that has dedicated parameters and resources for optimal and high speed operation of given functions. These special resources available within coprocessors, when properly utilized by a given application, typically result in a significant performance improvement over traditional means of using only conventional processors and associated development methods.

However, specialized coprocessors in and of themselves are not a panacea to the ills of general processors vis-à-vis processing throughput. Whereas specialized processors increase the speed of computing particular functions, they lack the flexibility of a conventional processor and introduce a very different set of programming methodologies, tools, and instructions. Moreover, when compared to conventional processor programming methods, the methods for specialized processors are cumbersome, error-prone, complex, and lacking in high level abstractions and libraries that are needed for ease of development and use, and there is a relative paucity of professionals who are skilled in the area of programming with such specialized processors.

To reap the benefits of both conventional processors and specialized coprocessors, attempts have been made to combine conventional processors and specialized coprocessors in a single system. However, the challenges associated with integrating specialized processors and co-processors with conventional processors, especially as such integration relates to software development and acceleration of high performance computing applications, have severely limited the use of specialized coprocessors in mainstream computing systems and platforms. Additionally, such systems have generally relied solely on the speed of the coprocessor (or adding multiple processors or coprocessors) to increase throughput, and therefore such systems lack any overall operational efficiency.

BRIEF DESCRIPTION OF THE DRAWINGS

FIG. 5 illustrates an example of a rotation matrix that may be used in connection with an embodiment of the invention.

FIG. 6 illustrates an embodiment of a process to calculate the intermolecular energies between a receptor and a ligand.

FIG. 11a illustrates an example of a scheduling table that may be used in connection with an embodiment of the invention.

FIG. 11b illustrates an example of a capability table that may be used in connection with an embodiment of the invention.

DETAILED DESCRIPTION

Figure 1:
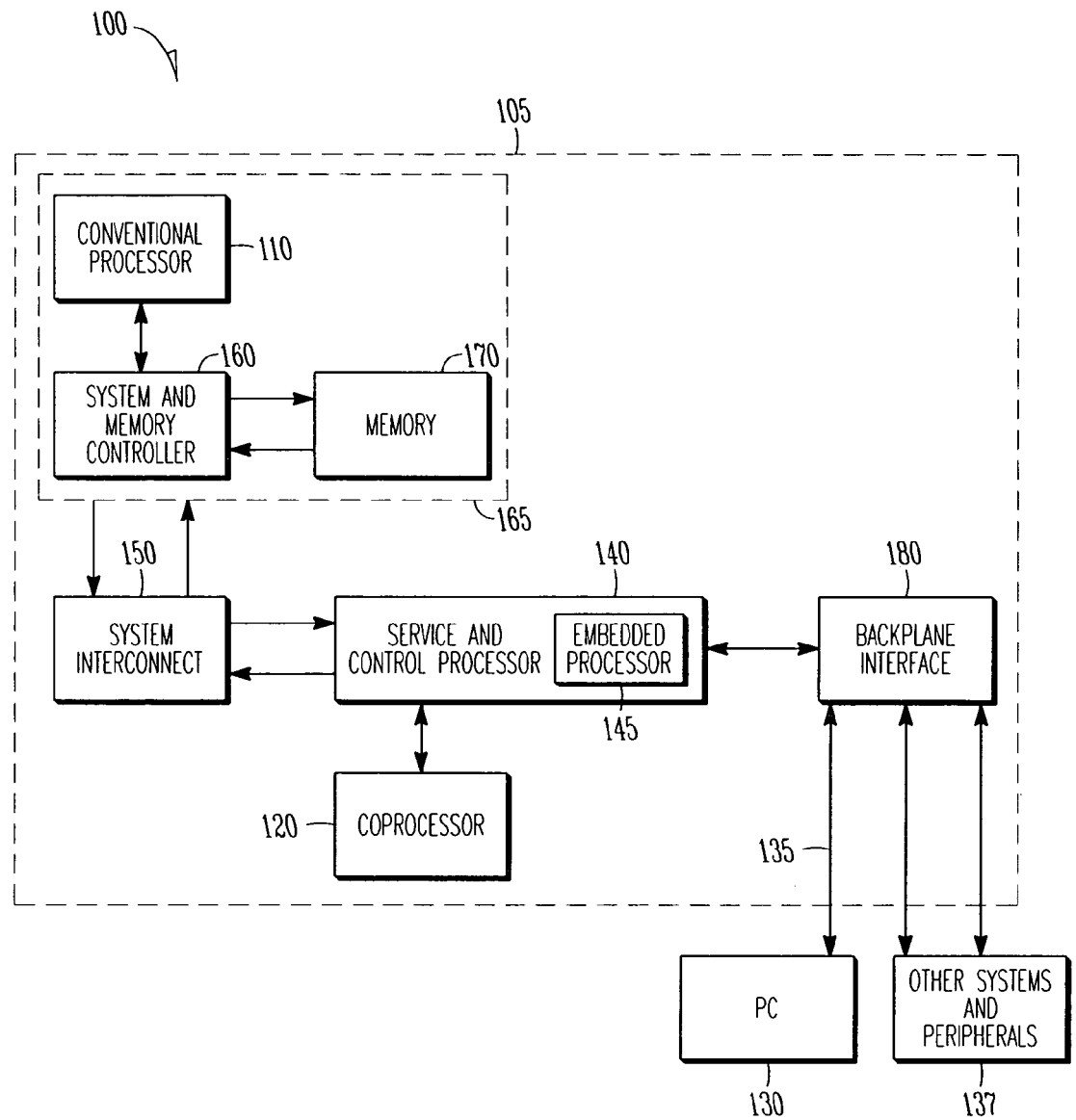
FIG. 1 illustrates an example embodiment of a system that includes both a conventional processor and a specialized coprocessor.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, a computer system addresses issues relating to system performance and speed. The embodiment includes conventional processors, specialized coprocessors, and high speed links between the processors, coprocessors, and other components and devices in the system. This combination of conventional processors and specialized coprocessors in various embodiments may be,referred to as a heterogeneous system. Other embodiments may also include methods and software that optimally map application processing requirements onto such a heterogeneous set of processors. This mapping does not impose any significant requirements on the development methodology compared to what is commonly required for developing applications for conventional processors, and is accomplished by first partitioning and then mapping data from an application onto the most optimal resources that are available for a high performance operation. Moreover, the various embodiments of such a system do not require designers to be familiar with either hardware design or details-of the coprocessor instruction set or development methods. In an embodiment, at compilation time, translation and linking mechanisms of the system handle these details.

FIG. 1 illustrates an embodiment of a system that includes, among other components, a conventional processor and a specialized coprocessor. In alternate embodiments, a system may have multiple conventional processors and multiple special coprocessors. Specifically, FIG. 1 illustrates a system 100 that includes a conventional processor 110 and a specialized coprocessor 120. The conventional processor 110 is part of a root complex subsystem 165 that further includes memory 170, and a system and memory controller 160. A system interconnect 150 is connected to the root complex subsystem 165, and the system interconnect 150 is further connected to a service and control coprocessor 140. In an embodiment, the system interconnect 150 is implemented through a field programmable gate array. In another embodiment, the service and control coprocessor 140 includes multiple embedded conventional processors 145. And in an embodiment, these multiple conventional processors 145 may be Power PC™ processors. The service and control coprocessor 140 communicates with the specialized coprocessor 120. A user may communicate with the system 100 via a personal computer 130 or other processor-based device. In one embodiment, the personal computer 130 communicates with the system 100 via a gigabit Ethernet link 135. The gigabit Ethernet link 135 is coupled to a backplane interface 180, which in turn is coupled to the service and control coprocessor 140. In an embodiment, the backplane interface 180 couples the system 100 to other similar systems with conventional processors and specialized coprocessors, and/or other devices, memory, and peripherals at 137. In one embodiment, the service and control coprocessor 140 and specialized coprocessor 120 are types of Field Programmable Gate Arrays (FPGA). In an embodiment, the root complex 165, system interconnect 150, service and control coprocessor 140, specialized coprocessor 120, and backplane interface 180 form a deskside server 105.

Field Programmable Gate Arrays have recently benefited from several technological advances. One such feature is programmable logic. Other advanced features include multiple embedded conventional processors within an FPGA (including parallel connectivity), multiple embedded multi-gigabit transceivers (for high speed data communications), embedded DSP functions, integrated Ethernet Media Access Controllers (MAC), embedded parallel connectivity, multiple embedded digital signal processing functions, multiple embedded memory resources, and embedded clock management capability. Embodiments of the inventions advantageously utilize these latest advanced features of FPGAs, which will be explained in connection with the operation of the system in connection with FIG. 3. Unlike embodiments of the invention, prior art systems such as conversion programs do not take full advantage of these advanced features because many of those prior art systems involve conventional compilers that convert C program code into FPGA gates without regard to these new advanced FPGA features.

One particular FPGA that may be used in connection with the present invention is a Virtex-4™ FPGA manufactured by XILINX®. (www.xilinx.com). The Virtex-4™ FPGA is capable of operating at a 500 MHz clock rate for many functions such as counters, adders, and storage implemented through lookup tables. Additionally, the Virtex-4™ FPGA includes an enhanced PowerPC™ core that delivers 680 DMIPS performance at 450 MHz, and I/O achieved by the Virtex-4™ FPGA approaches 600 Mb/s per single ended I/O with buses as wide as 432 bits. Embodiments of the invention which use the Virtex-4™ FPGA employ these features of the Virtex-4™ FPGA to attain its accelerated processing capabilities.

Figure 1A:
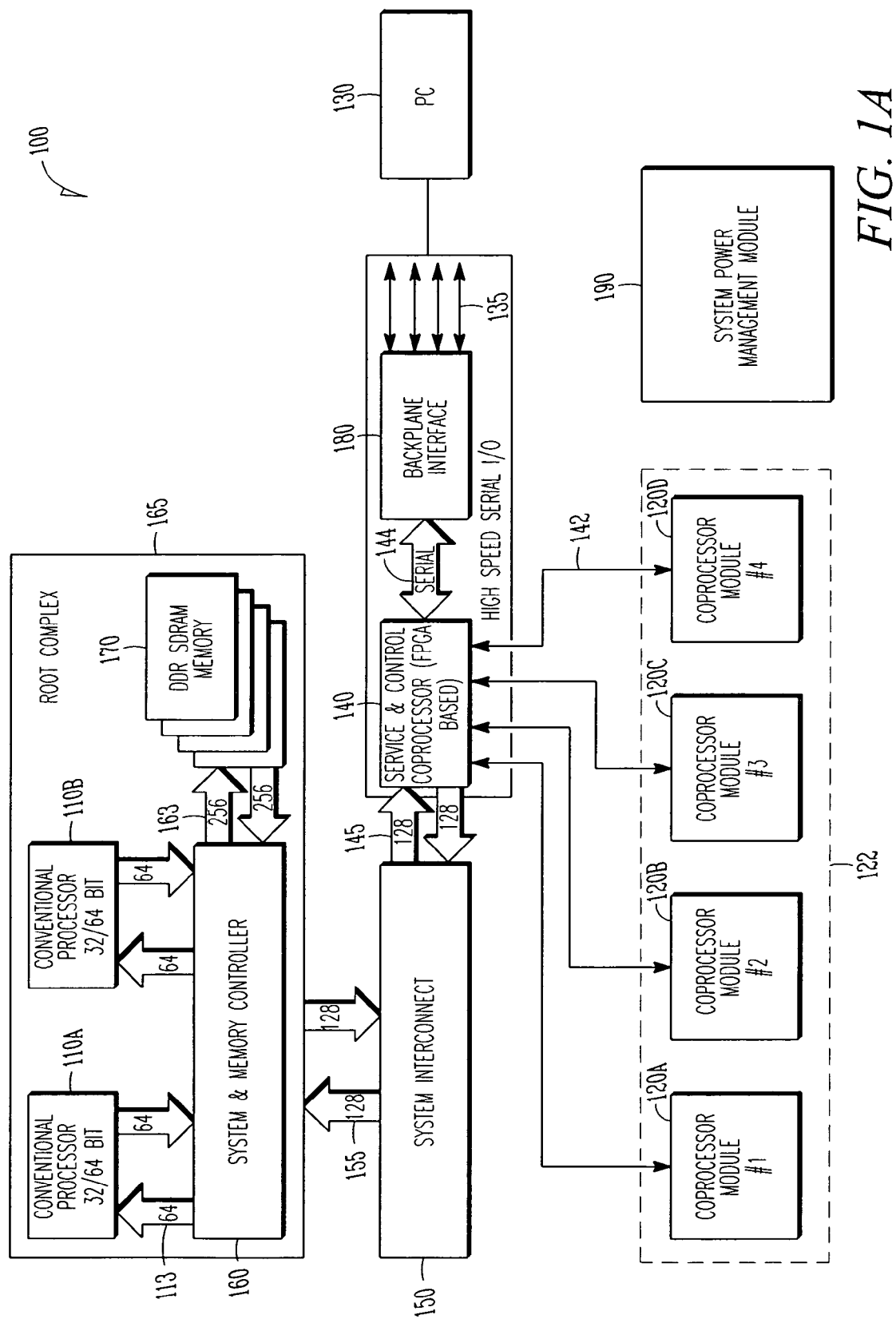
FIG. 1a illustrates an example embodiment of a system that includes a plurality of conventional processors and a plurality of specialized coprocessors.

FIG. 1a illustrates another embodiment of a system that includes a conventional processor and a specialized coprocessor. In particular, FIG. 1a illustrates a system 100 that includes multiple conventional processors 110a and 110b, and multiple specialized coprocessors 120a, 120b, 120c, and 120d. In one embodiment, the conventional processors 110a and 110b are 32 bit processors. In another embodiment, they are 64 bit processors. Other bit length or word length processors could also be used. To accommodate the embodiments that utilize 64 bit processors, 64 bit paths 113 are provided between the conventional processors 110a and 110b and the system and memory controller 160. FIG. 1a further illustrates that in an embodiment, the memory 170 may be one or more Double Data Rate Synchronous Dynamic Random Access Memory (DDR SDRAM) modules, and that such memory modules 170 communicate with the system and memory controller 160 through 256 bit paths 163. Other communication paths illustrated in the embodiment of FIG. 1a include 128 bit paths 155 between the system and memory controller 160 and the system interconnect 150, 128 bit paths 145 between the system interconnect 150 and the service and control processor 140, serial I/O paths 142 between the service and control processor 140 and the specialized coprocessors 120a, 120b, 120c, and 120d, and serial I/O paths 144 between the service and control processor 140 and the backplane interface 180. In an embodiment, each serial I/O path or line has four channels. FIG. 1a further illustrates that in this particular embodiment the multiple specialized coprocessors 120 are resident on modules with advanced mezzanine cards (AMC) 122. A system power management module 190 provides the necessary power requirements to the system 100.

One or more embodiments take advantage of the Advanced Telecommunication Computing Architecture (also known as the PICMG3 family of standards, the Architecture, or ATCA). The ATCA standard embodies the shelves, boards, mezzanines, and management of such computing and telecommunications systems. By designing a system based on this architecture, a standards based modular platform will be constructed on which a plurality of applications may be built. In a typical system based on this architecture, the primary application focus is Telco Carrier Grade Applications, and the secondary application focus is Data Center Modular Servers. The Architecture provides for network connected independent rack mount servers, bus connected modular compute elements, differential signaling (capable of 10 Gbps), and a single backplane that supports many fabric technologies and topologies. An embodiment of the invention is based on such an Architecture, and in the embodiment of FIG. 1, the rack mount servers are implemented through the coprocessors 120, the bus connected modular elements include the processors 110, coprocessors 120, and the service and control processor 140 (the bus includes the 256 bit paths 163, the 128 bit paths 155, and the high speed serial I/O paths 142), the differential signaling through the Ethernet connection 135, and the backplane interface through the backplane interface 180. Multiple systems can be connected together through the backplane interfaces, through either a star, mesh fabric, or some other system interconnect technology, as will be illustrated in detail infra in connection with the discussion of FIG. 1b. In such systems interconnected through a backplane interface, the capacity of such interfaces is up to 2.5 Tbps. The details of the manner in which an embodiment utilizes this Architecture to implement a deskside accelerated processing system is discussed in connection with FIG. 3.

Figure 1B:
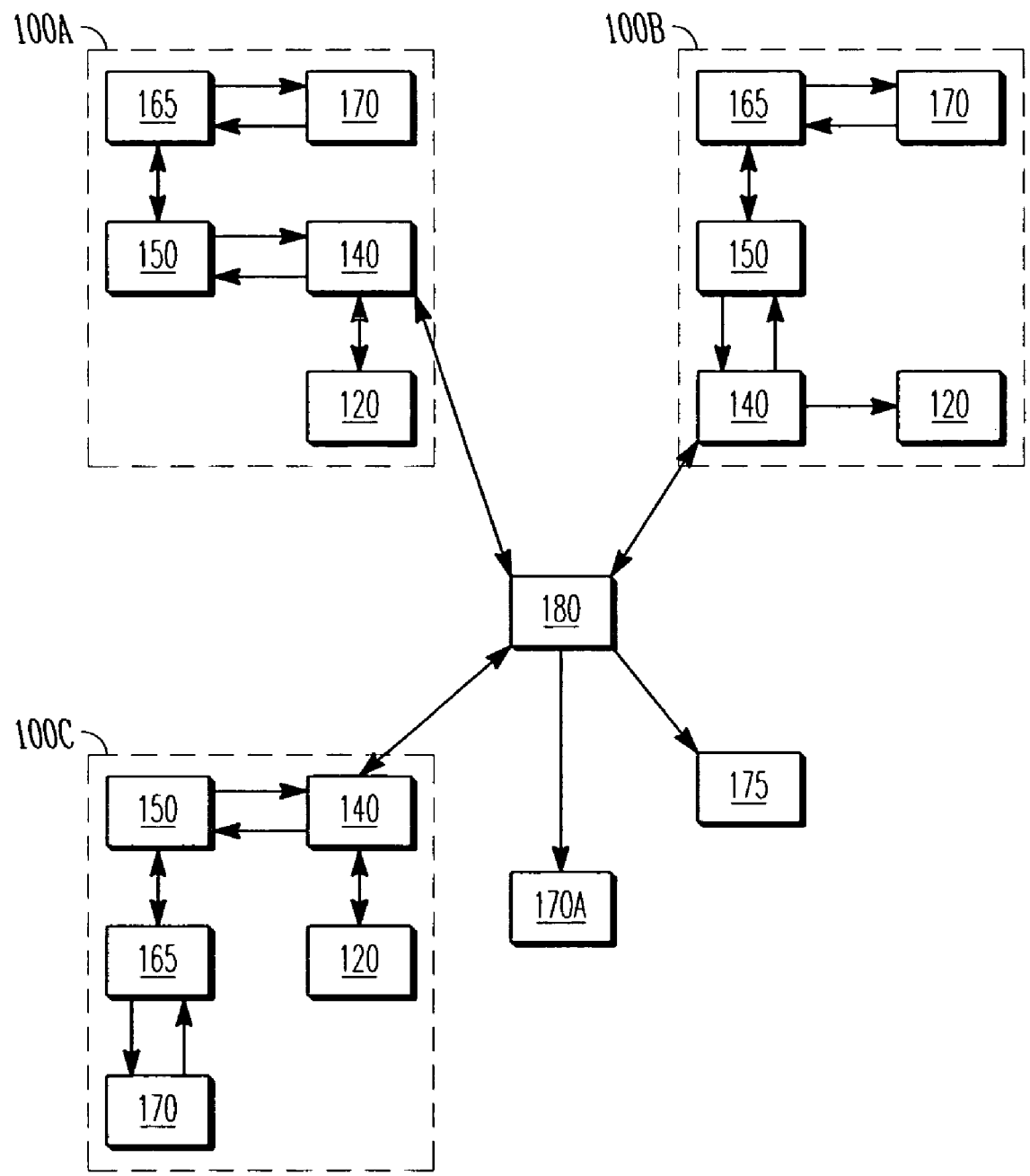
FIG. 1b illustrates another example embodiment of a system that includes a plurality of conventional processors and a plurality of specialized coprocessors.

FIG. 1b illustrates in block diagram form yet another embodiment of a heterogeneous hardware system 100. Specifically, FIG. 1b diagrams a system that has multiple heterogeneous subsystems 100a, 100b, and 100c. In other embodiments, there could be even more heterogeneous subsystems attached to the system. As shown in FIG. 1b, each subsystem 100a, 100b, and 100c is connected to each other through their respective backplane interfaces 180. Additionally, in the embodiment of FIG. 1b, other devices and components are coupled to one or more of the subsystems such as the user interface 130, additional memory 170a, and other devices or components 175 such as a printer.

Figure 2:
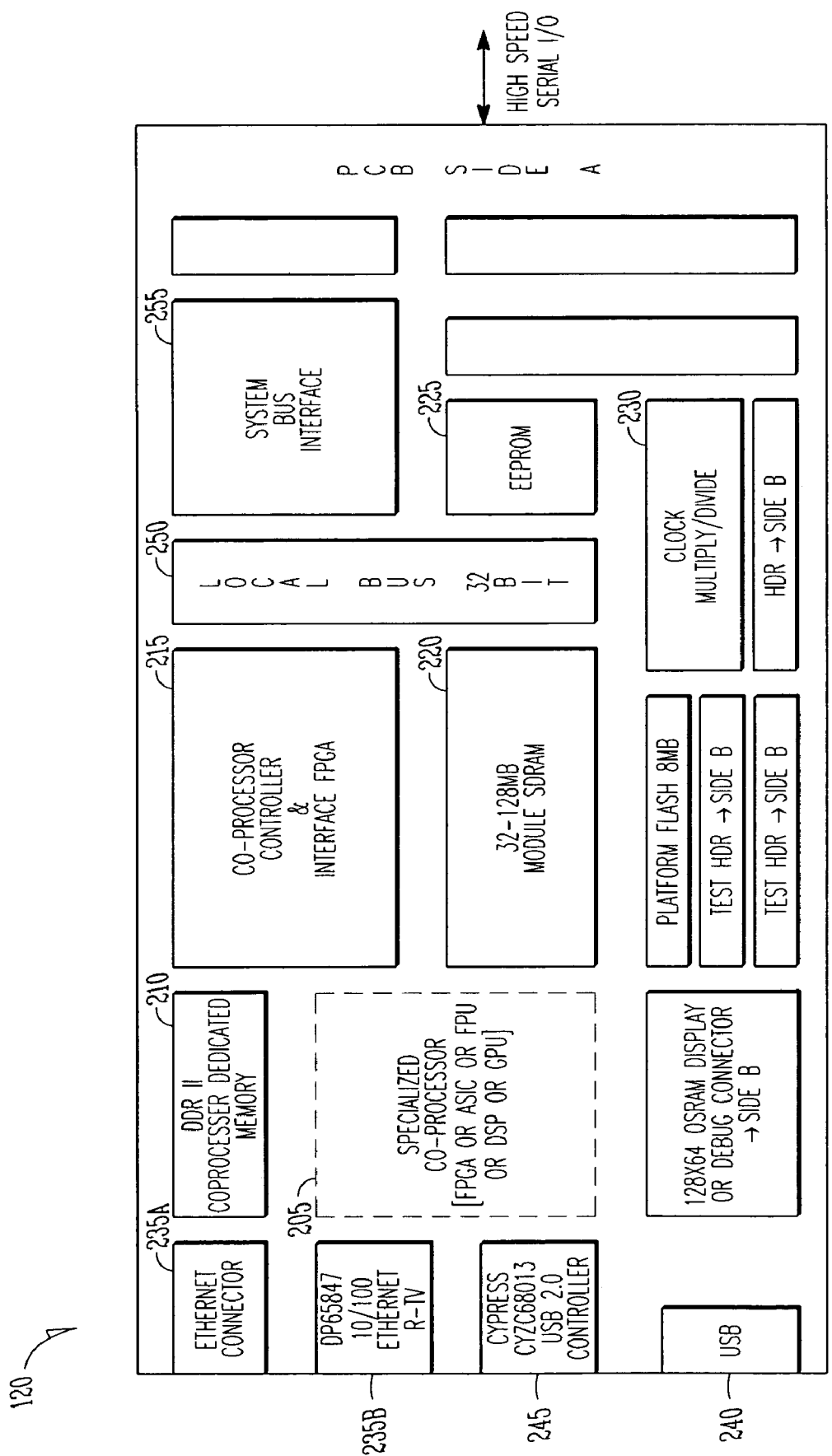
FIG. 2 illustrates an example embodiment of an internal structure of a specialized coprocessor.

FIG. 2 illustrates an embodiment of a specialized coprocessor module 120 that may be used in connection with one or more embodiments of a heterogeneous system 100. The coprocessor module 120 has a specialized coprocessor 205. In other embodiments, there may be multiple coprocessors 205 embedded in the coprocessor module 120. The specialized coprocessor 205 may include such devices as Field Programmable Gate Arrays (FPGA), Field Programmable Object Arrays (FPOAs), Math Coprocessors, Application Specific Integrated Circuits (ASIC), Floating Point Units (FPU), Digital Signal Processors (DSP), or Graphics Processing Units (GPU). Other components or modules within a coprocessor module 120 may include a DDR II coprocessor dedicated memory 210, a coprocessor controller and interface (FPGA) 215, a SDRAM module 220, an Electrically Erasable Read Only Memory (EEPROM) 225, and a clock multiplier/divider 230. In an embodiment of the system 100, one or more coprocessors 120 include an Ethernet connector 235a and an Ethernet PHY 235b, and Universal Serial Bus port 240 (USB) and USB controller 245. These connectors, ports and controllers are used primarily to access external databases or networks, and for debugging purposes. The components of the coprocessor module 120 communicate with each other via a local bus 250, and the coprocessor 120 communicates with the service and control processor 140 via system bus interface 255. In an alternate embodiment, the specialized and dedicated hardware components are connected to the one or more conventional processors via a shared memory architecture such as a Direct Memory Access (DMA) engine.

In an embodiment, associated with the system 100 is a library of macros. Each one of these macros has a particular function it executes, and each macro is associated with a particular specialized coprocessor 120, two or more coprocessors 120 in a system 100, or two or more specialized coprocessors spread over multiple subsystems 100a, 100b, 100c, . . . 100N. The relationships pertaining to which specific coprocessors 120 are associated with which specific macros are kept within a personality module. For example, one particular specialized coprocessor or coprocessors may be configured to perform summing and other related mathematical operations. Another particular specialized coprocessor or coprocessors could be configured to perform graphics and other related operations. And yet another specialized coprocessor may be configured to perform a complex and highly specific calculation or set of calculations for an engineer, scientist, or financial advisor. In general, in an embodiment, the type of computation that a particular specialized coprocessor performs depends on the data to be processed therein, and in particular, the data type, the amount of that data type, and the operations to be performed on that data. Therefore, in an embodiment, a coprocessor may be viewed as being represented by a set of specialized instructions that the coprocessor executes and the data streams that the coprocessor processes.

The system 100 of FIGS. 1, 1a, and 1b with their one or more conventional processors 110 and one or more specialized coprocessors 120 provide a high performance computing environment. In one or more embodiments, the heterogeneous hardware platform 100 is configured by a software design system that transparently distributes computational load and I/O load between one or more conventional processors and multiple specialized coprocessors. This distribution results in increased computational efficiency and higher performance compared to running the application on a system with only conventional processors. This increased efficiency and performance results in part because the load distribution removes any contention from multiple hits on multiple coprocessors. In one or more embodiments, a software component is included that partitions software applications based on the applications' functions, resource requirements, and the availability of specialized resources such as specialized coprocessors. This partitioning may involve hardwired digital circuits and/or reconfigurable digital circuits. For example, in an embodiment, a system executes the partitioning while varying the parameters and configurations of the available coprocessors and hardware to obtain an optimal mapping and allocation of resources between the system's conventional processors and the system's associated coprocessors including hardware reconfigurable coprocessors.

In an embodiment, an application, whether it be scientific, financial, or other computationally intensive application, is set up to run on the system 100 of FIGS. 1, 1a, and/or 1b as follows. An application program is first analyzed to determine the operations and data that cause the execution of these programs to slow down considerably. In one embodiment, this is a process that relies on human intervention to track, analyze, and determine the time and/or processor cycles that a particular set of instructions within the application code requires. In another embodiment, which may be referred to as an automatic embodiment, a software system analyzes the application code and its structures to determine the sections of the code that are bottlenecks. Then, at the compile time of these applications on the system, the library of macros is linked to the application. For example, if it has been determined that a particular segment of code executes slowly because it performs complex graphics operations, that code section, at compile time, is bypassed by linking to a macro (resident in a particular specialized coprocessor) that is specifically configured for graphics computations. Then, at run time, the data that is crunched in such computations can be streamed over high speed connections and executed by the graphics configured specialized processors.

In an embodiment, a technique, which will be referred to herein as data streaming, is used to transport data between the memories 170 in the root complex system 165 and the coprocessors 120. In this embodiment, the coprocessors 120 use data streams as a fundamental object for processing of the data. In essence, data streams provide for a method of communication between root complex memory 170 and coprocessor computation elements that have operators to manipulate these data streams. The results of the coprocessor manipulations are packaged as an output data stream and transmitted back to the control coprocessor 140.

Figure 9:
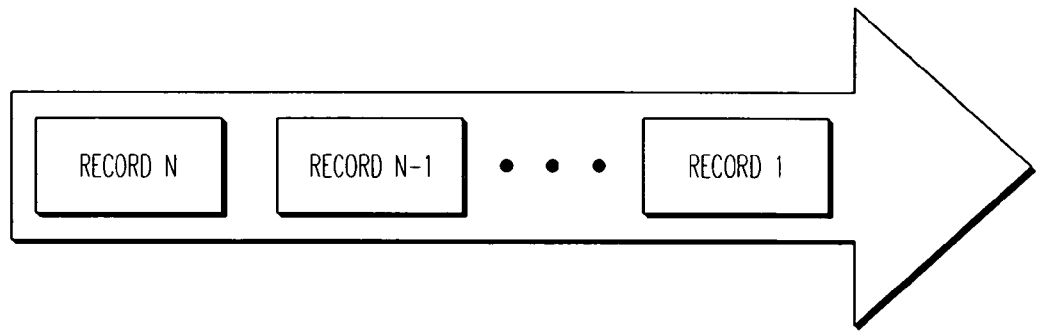
FIG. 9 illustrates an example of a data stream that may be used in connection with an embodiment of the invention.

FIG. 9 illustrates how in an embodiment a data stream is defined as an ordered set of independent records (Record 1 through Record N) in a logical data stream. In this embodiment, the data streams are handled by the control processor 140. Specifically, the control processor 140 loads a data stream, stores the data stream, transmits the data stream to one or more coprocessors 120, and receives the output from the coprocessors 120 in the form of another data stream. The logical data streams are mapped onto the physical high speed serial I/O channels 142 using different multiplexing methods that are dependent on the configuration of the coprocessor 120 and the computation that will be performed on the data stream. Since each exact embodiment of a data stream mapping depends on the particular application, a more detailed example of the data streaming is provided infra in connection with a protein docking example.

Figure 3:
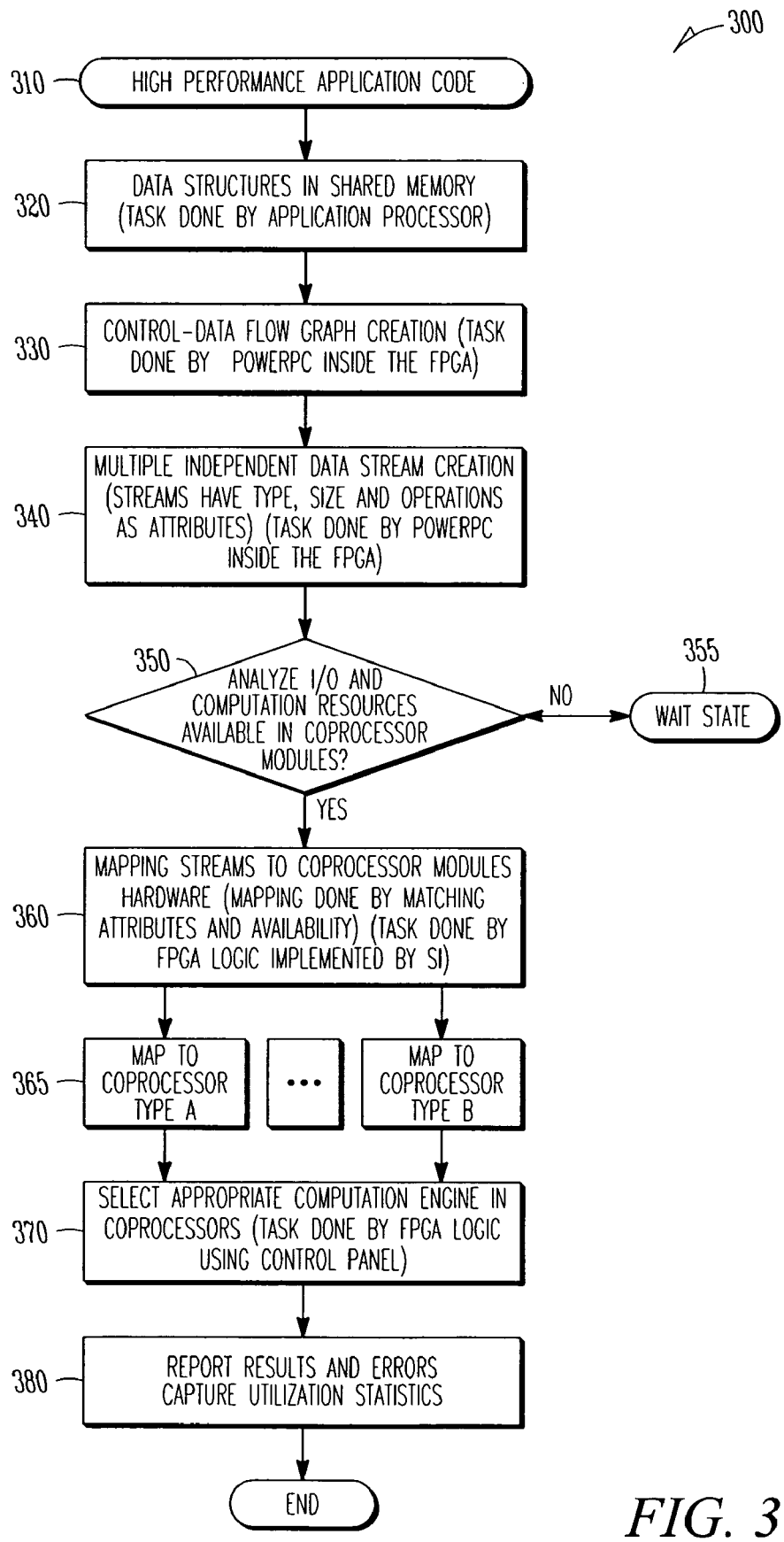
FIG. 3 illustrates a flow chart of a process that analyzes application code and delegates processing among one or more conventional processors and one or more specialized coprocessors.

After an application program is compiled and linked, it can be initiated and executed by a user from a personal computer 130 or similar device. FIG. 3 illustrates an example embodiment of the process flow of such an application in an embodiment of a heterogeneous system 100. Specifically, FIG. 3 illustrates an example embodiment of a process 300 that executes application code 310, and delegates the execution of that code and data processing among one or more conventional processors 110 and one or more specialized coprocessors 120. In this embodiment, the application code 310 executes in a conventional processor 110. Because there are multiple conventional processors in the root complex 165, no porting operations are necessary to run the application on the root complex. When the application 310 executes a portion of the code that has been identified as a computational bottleneck in the above-described set up process, the conventional processor executes a call to the previously linked macro to handle this computationally intensive code. The conventional processor also sets a flag in memory 170 that identifies the data to be used in this complex computation, and that indicates that the data is available to be processed. This is identified by block 320 in FIG. 3. The call to the linked macro causes a signal to be sent to the service and control processor 140. The service and control processor 140 functions as an analyzer and a scheduler. In an embodiment, the analyzer function is implemented in the multiple embedded conventional processors 145, and the scheduler is implemented in hardware circuits using logic gates in the FPGA-based service and control processor. In its analysis mode, the service and control processor then creates a control data flow graph or data structure at 330. This control data identifies and resolves conflicts in the upcoming computations and data, and through the data structure sets up an ordering of the computations. That is, the service and control coprocessor, as an analyzer, performs data dependency checks on the application and creates compatible data streams. An example of the data dependency checks performed by the service and control processor is illustrated in connection with the discussion of a protein docking example infra. After any potential conflicts have been resolved by creating compatible data streams, the service and control coprocessor 140 examines the data that has been flagged in memory 170. Specifically, the multiple embedded conventional processors 145 determine the size of the data, the type of the data, and the operations that will be performed on that data at 340. The multiple embedded conventional processors 145 know the operations to be performed on that data because of the link that was invoked through the application code 310, and the information in the personality module relating to that link and its associated macro.

At 350, the service and control coprocessor 140 implements its scheduling function by checking the coprocessor(s) 120 that are responsible for executing the macro associated with the link that was called from the application 310. First, the service and control processor 140 checks to see if the macro coprocessor is available. If the coprocessor is not available, the service and control processor goes into a wait state at 355. If the coprocessor is available, the service and control processor at 360 uses a personality module to configure the coprocessor for that macro (since, in an embodiment, a coprocessor may be responsible for more than one macro, and further since in another embodiment, a coprocessor may be reconfigured multiple times during the execution of an application.). In an embodiment, the personality module is a compilation of functions, and their related configurations, stored in electronic form, that can be called upon to define the configurations of the coprocessor modules and the functionality that they provide to the desired applications. At this point, the service and control processor streams the data from memory 170 over the high speed serial I/O 142 connecting the service and control processor with the coprocessors (365). In this manner, the coprocessors 120 never access the memory 170. Rather, the service and control processor 140, through its scheduler, provides the data to the coprocessor(s) 120 (In essence, the service and control processor 140, after determining that a particular coprocessor is available and properly configured, just jams the data to the coprocessor). Additionally, data may be streamed from one coprocessor to another. This is particular useful in embodiments where the results of one coprocessor serve as the input to another coprocessor. Then, the service and control coprocessor selects the appropriate computation engine in the coprocessor 120 at 370 (such as digital signal processor computation engine). The coprocessor 120 then executes the calculations at 380, and reports the results and any errors back to the service and control coprocessor 140. In an embodiment, this mapping 360 to a particular coprocessor is accomplished by examining the type and size of the data in the data stream, and the operations that will be performed on that data in the data stream. For example, depending on the size of the data block flagged by the conventional processor in memory 170, the service and control processor 140 may stream the data to several coprocessors for parallel processing. In another embodiment, a block of data may be simultaneously distributed over all high speed serial I/O paths 142 to every coprocessor 120 in a system.

In an embodiment, after the results and errors 380 are reported back to the conventional processor 110, the coprocessor 120 will transmit a signal to the service and control coprocessor 140, informing the service and control coprocessor 140 that that coprocessor 120 is available for new and/or further processing. Then, when the application executing in the conventional coprocessor invokes the link to another macro, the service and control coprocessor 140 may stream the data for this macro to the newly available coprocessor (after any necessary reconfiguration). If data type, data size, and operations to be performed on the data are such that the coprocessor needs to be reconfigured, the service and control processor 140 will access the personality module and reconfigure the coprocessor for that data.

In one or more embodiments, this architecture involving one or more conventional processors 110 and one or coprocessors 120 is configured as a producer-consumer set up, wherein the consumer is the coprocessor. Application programs executing on such a system are unaware of this producer-consumer structure. With this architecture, any complex chip (coprocessor) may be introduced into the system as a coprocessor, and such introduction and incorporation is invisible to the application program. Consequently, the system 100 can be easily adapted to specialized applications with the introduction of such specialized chips.

In an embodiment, the coprocessor can be configured to any word length (e.g. 7 bits). Prior art processors on the other hand are fixed at some word length (e.g. 32 or 64), thereby forming only a single path of a single width (32 or 64). Consequently, if maximized operational efficiency calls for a path width of 7 bits, and the path is fixed at a width of 32, 25 bits are effectively wasted in fixed path width systems as found in the prior art. However, with the configurability of the path width as in an embodiment of the invention, the coprocessor receives exactly the data that it requires on every clock cycle, and can receive multiple blocks of data at that word width per clock cycle (e.g., four 7-bit words over a 32 bit path per clock cycle).

EXAMPLE APPLICATION EXECUTION ON A HETEROGENEOUS SYSTEM

Protein-Ligand Binding

The biotechnology and pharmaceutical industries have adopted computational methods to assist in the discovery and development of new drug candidates. The "virtual screening" of new drug candidates is accomplished by the comparison of a target protein (rather, a mathematical representation of the target protein) to a database comprising mathematical representations of molecular structures. From such a database, a subset of new drug candidates may be identified through algorithms which predict the binding of each candidate to the target protein. This is because, in nearly all biological activity, the first step is the binding of one molecule (the ligand) to a complementary, larger molecular structure (the target protein), and computational methods can identify molecular structures with which a target protein can bind to form a complex. Such methods help researchers understand how the resulting complex elicits biological signals to other systems. However, the volume and complexity involved in calculating and comparing these proteins to databases of molecular structures is extensive, and without access to super computing or accelerated processing, such endeavors are impractical. Moreover, not every lab has access to supercomputers, and not every software professional is familiar with programming and working with supercomputers. Therefore, a deskside heterogeneous system like the examples illustrated in FIGS. 1, 1a, and 1b could be used to tackle such a complex computing problem.

The goal of protein docking applications is to perform two main tasks. First, such docking applications should accurately predict the association of ligand-receptor complexes from three-dimensional receptor structures. Second, these applications should identify a subset of chemicals that are enriched in molecules capable of binding tightly to the active site of a given 3D receptor structure. One of the key ways of predicting favorable binding between chemical entities and a receptor structure is via the calculation of intermolecular interaction energies of all the generated ligand-receptor complexes and identifying the most energetically favorable complexes. Each chemical entity can be represented by hundreds of different conformations, wherein each conformation is generated by rotating and translating the molecules around the mass center of the molecules and within a bounded region (or domain) of the active site of the receptor. Calculating the intermolecular energy for each of these hundreds of conformations for each of the chemical entities in a database represents a very heavy computational load. Typically, applications that are known in the art to handle these calculations use standard processors in parallel (e.g., large clusters of high end PC servers). However, considering the numerous conformations of a receptor and ligand, standard processors become limited by their cache (wherein such elements as floating point hardware become overwhelmed with the data). As a result, bottlenecks occur, and standard processor systems work on such problems for many hours. However, as explained above, with a heterogeneous embodiment such as illustrated in FIGS. 1, 1a, and 1b, the size of the computational unit (i.e., coprocessors) can be increased, and the character of the computational unit can be changed (e.g., to more effectively handle a particular type of computation), thereby improving computational efficiency of the algorithm and providing significant advantages in speed, power utilization, and footprint and hardware costs.

In such a docking application, the receptor and ligand molecules are represented by the Cartesian coordinates of each of their atoms, associated force field, and atom id (i.e., X, Y, Z, E I). These parameters are used to calculate the intermolecular energies. In a typical case, a ligand molecule would consist of approximately 20 to 40 atoms, whereas the active site or domain of a receptor molecule would consist of about 2000 to 4000 atoms.

For example, the atoms of a ligand molecule may be represented as follows:

Atom-1: $X_{L1}, Y_{L1}, Z_{L1}, E_{L1}, I_{L1}$

Atom-2: $X_{L2}, Y_{L2}, Z_{L2}, E_{L2}, I_{L2}$

Atom-3: $X_{L3}, Y_{L3}, Z_{L3}, E_{L3}, I_{L3}$ $\vdots$

Atom-n: $X_{Ln}, Y_{Ln}, Z_{Ln}, E_{Ln}, I_{Ln}$

Wherein once again X, Y, and Z represent the Cartesian coordinates of an atom, E the force field associated with that particular atom, and I the identity of that atom (used as an index into an array of data concerning that atom). Similarly, the atoms of a receptor molecule may be represented as follows:

Atom-1: $X_{R1}, Y_{R1}, Z_{R1}, E_{R1}, I_{R1}$

Atom-2: $X_{R2}, Y_{R2}, Z_{R2}, E_{R2}, I_{R2}$

Atom-3: $X_{R3}, Y_{R3}, Z_{R3}, E_{R3}, I_{R3}$ $\vdots$

Atom-N: $X_{RN}, Y_{RN}, Z_{RN}, E_{RN}, I_{RN}$

The intermolecular energy may be calculated as follows:

$$E = \sum_{i<j}(K_a^{12}/R_{ij}^{12} - K_b^6/R_{ij}^6) + \sum_{i<j} Q_i Q_j / R_{ij}^2$$

In the intermolecular energy equation, $R_{ij}$ is the Euclidean three-space distance between a ligand atom and a receptor atom. This distance is calculated as follows:

$$R_{ij}^x = ((X_L - X_R)^2 + (Y_L - Y_R)^2 + (Z_L - Z_R)^2)^{1/2}.$$

$Q_i Q_j$ is the electrostatic interaction $E_R * E_L$. The values of $E_R$ and $E_L$ are known quantities for each atom in a particular receptor or ligand, and are stored in a lookup table in the system.

$K_a, K_b$ are the energy coefficients based on atom type and associated force field, and are calculated as follows:

$$K_a = (VDS[I_{dR}].R + VDS[I_{dL}].R)^{12} * (VDS[I_{dR}].E + VDS[I_{dL}].E)^{0.5}.$$

$$K_b = (VDS[I_{dR}].R + VDS[I_{dL}].R)^{6} * (VDS[I_{dR}].E + VDS[I_{dL}].E)^{0.5} * 2.$$

In this embodiment, VDS is an array that contains the energy values for all particular atom types. The indexes $I_{dR}$ and $I_{dL}$ into the VDS array refer to the energy associated with a particular receptor atom and a particular ligand atom respectively. The R field and E field in the array refer to the Van der Waals forces and the electrostatic forces respectively. Therefore, in the above intermolecular energy equation, the first expression $(K_a^{12}/R_{ij}^{12} - K_b^6/R_{ij}^6)$ relates to the calculation and accumulation of the Van der Waals forces, and the second expression $Q_i Q_j / R_{ij}^2$ refers to the calculation and accumulation of the electrostatic forces. As the system progresses through the translation iterations, and the distances between a receptor atom and a ligand atom increase, the effect of the Van der Waals forces becomes less and less significant, and the effect of such forces eventually becomes negligible. The coefficients $K_a$ and $K_b$ are dependent only on atom types. They do not change for every ligand conformation and are therefore calculated separately and only once per ligand-receptor pair to improve runtime efficiency.

Figure 4:
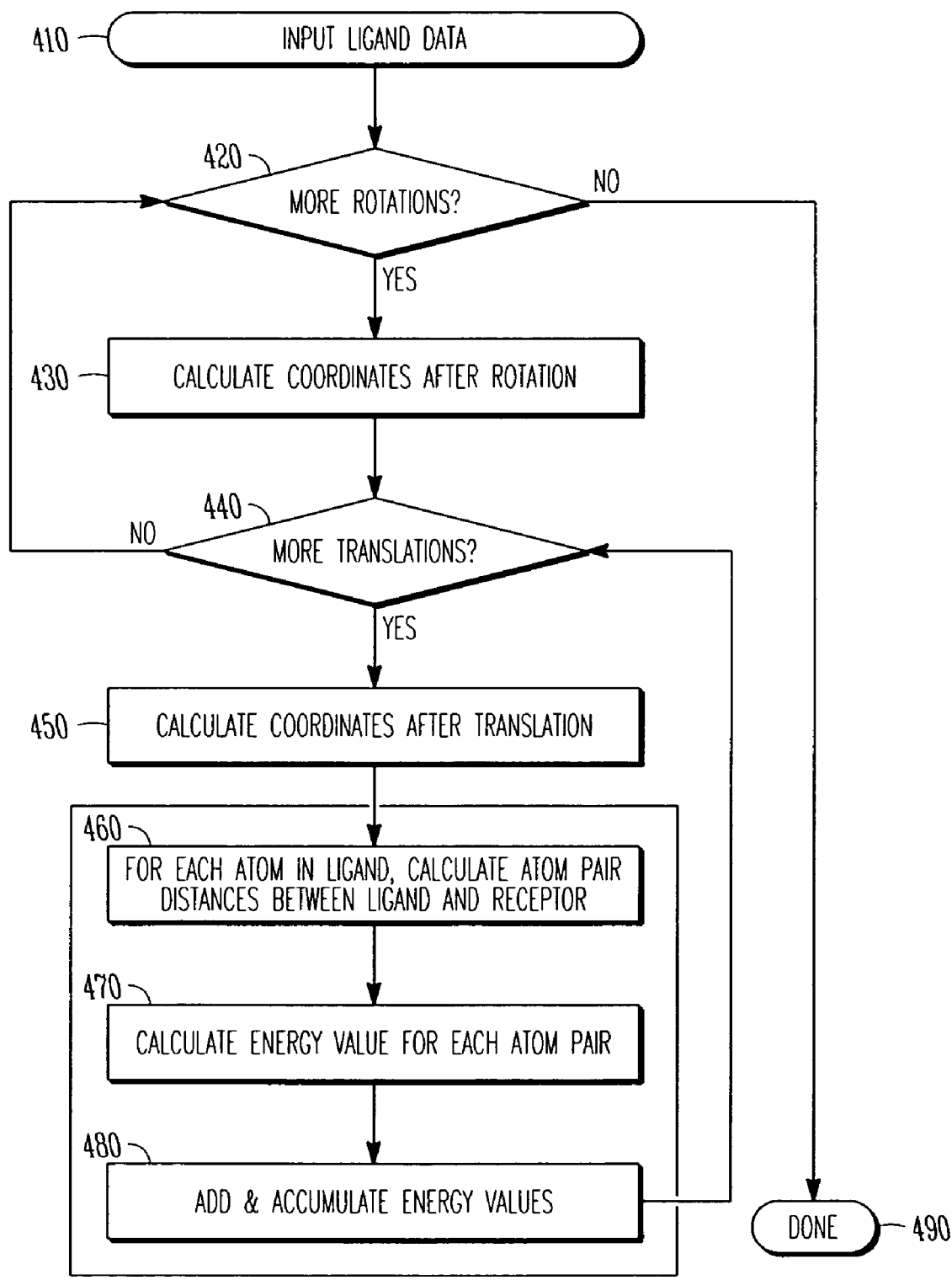
FIG. 4 illustrates a flow chart of an example embodiment of a process to calculate the intermolecular energies of a receptor molecule and a ligand molecule.

FIG. 4 illustrates an embodiment of an algorithm 400 that calculates the intermolecular energy (Van der Waals forces and electrostatic forces) for each receptor atom—ligand atom pair. In general, the system selects a first atom in the receptor, and calculates the intermolecular energy between it and each atom in the ligand. After the intermolecular energy between this first atom in the receptor and each atom in the ligand is calculated, these intermolecular energies are summed, and stored as a total energy value for this particular receptor atom. After this is completed for the first receptor atom, the intermolecular energy is calculated for a second atom in the receptor and each atom in the ligand, and the intermolecular energies for this second receptor atom are summed and stored. This iterative scheme is repeated for each receptor atom and each ligand atom, thereby obtaining a set of intermolecular energies for this conformation of the ligand.

After the calculations are done for a particular conformation, a new conformation is generated, and the intermolecular energies for each possible pairing of receptor atoms and ligand atoms is performed. A new conformation of the ligand is generated by rotating the ligand around its mass center and translating the ligand. The rotation of a computer-represented entity is well known in the art, and will not be explained in detail here. In an embodiment, a rotation matrix can be used, and such a matrix is illustrated in FIG. 5. When the ligand is rotated, while the X, Y, and Z coordinates change, the X, Y, and Z coordinate distances to the mass center remain the same. In contrast, the translation of a ligand involves changing the X, Y, and/or Z distance of that atom from the mass center. In an embodiment, as illustrated in FIG. 6, these rotations and translations are performed in a nested loop fashion, and for each possible rotation and translation position, the ligand coordinates are calculated. This results in a particular conformation, and for each conformation, all intermolecular energy calculations are calculated for each possible receptor atom and ligand atom pair as described above.

Referring back to FIG. 4, the calculation of the intermolecular energies for all conformations and all receptor atom and ligand atom pairings is illustrated in flowchart form. The algorithm of FIG. 4 has two core calculation kernels—an outer loop and an inner loop. The outer loop iterates through different conformations of the ligand (rotations and translations), and the inner loop performs the distance and energy calculations for each receptor atom and ligand atom pair. Referring specifically to FIG. 4, ligand data is input into the system at 410. The process first checks at 420 whether there are more rotations. If there are no more rotations, the algorithm 400 terminates at 490. If there are more rotations, new coordinates are calculated at 430 after the new rotation. After calculating the new coordinates, the process at 440 checks to see if there are more translations. If there are no more translations, the process returns to block 420 to determine if there are more rotations. If there are more translations, the system calculates the coordinates after translation at block 450. Then, at 460, for each atom in the ligand, the atom pair distances between the ligand and receptor are calculated. The energy value for each atom pair is calculated at 470, and the energy values are added and accumulated at 480.

Figure 7:
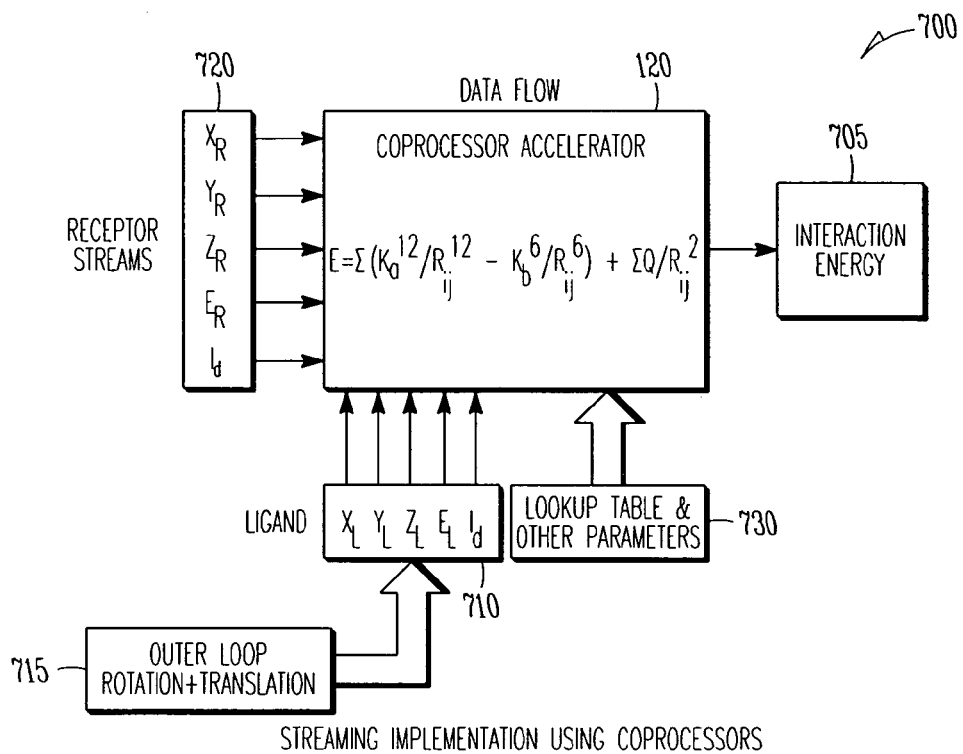
FIG. 7 illustrates an embodiment of a coprocessor configured to calculate the intermolecular energies between a receptor and a ligand.

FIG. 7 illustrates an embodiment of an accelerated heterogeneous processor 700 and the manner in which such an embodiment calculates intermolecular energies 705 between a receptor atom and a ligand atom. In this embodiment, the calculation of new conformations via rotations and translations, and the concomitant calculation of new ligand coordinates, are performed by a conventional processor (110) since these calculations are not processor intensive. After a new set of ligand coordinates are calculated (e.g., $X_{Ln}, Y_{Ln}, Z_{Ln}$) in the outer loop, FIG. 7 illustrates how the new ligand coordinates 710 (from rotations and translations 715) are streamed from memory 170 to a coprocessor 120 (by service and control processor 140). Similarly, a new set of receptor coordinates 720 (e.g., $X_{RN}, Y_{RN}, Z_{RN}$), when they are needed, are streamed to the coprocessor 120. As further indicated in FIG. 7, and as will be explained in more detail in connection with FIG. 8, the coprocessor 120 has been configured to calculate the intermolecular energy for each receptor atom and ligand atom pair (as identified by the iterations of the inner and outer loop). FIG. 7 further indicates that data and parameters from lookup tables 730, which in an embodiment are resident in the memory 170, are also streamed to the coprocessor 120. In an embodiment, this table includes the values of the Van der Waals forces for particular atoms, the values of the electrostatic forces for particular atoms, values for the electrostatic interaction ($E_R^* E_L$), and rotational matrixes based on the trigonometric expressions as illustrated in FIG. 5.

Figure 10:
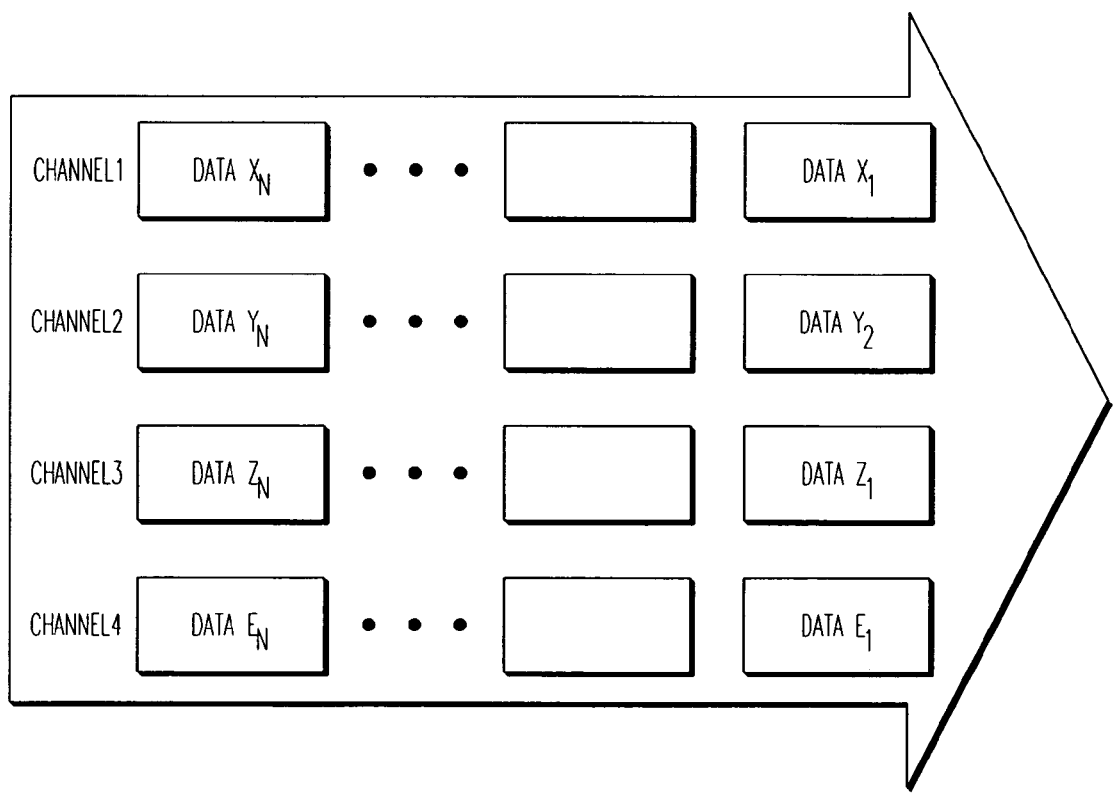
FIG. 10 illustrates an example of a physical data stream distributed over several channels that may be used in connection with an embodiment of the invention.

The details of an embodiment that streams data from the memory 170, through the service and control processor 140, to the one or more coprocessors 120, in a protein docking example, are as follows. FIG. 10 illustrates how each record in a logical data stream contains a value representing either an X coordinate, a Y coordinate, a Z coordinate, or an energy value E of the atoms in a ligand. FIG. 10 further illustrates the manner in which these data are mapped onto physical channels in the system. In this embodiment, the data streams are referenced by their base address in memory and their end address in memory, or their base address in memory, their record size, and the length expressed as the number of records. As such, there is no length restriction on data streams, and the service and control processor 140 has a mechanism to signal to a coprocessor 120 the start and end of a stream of data.

A coprocessor 120, depending on its configuration and capabilities, can handle multiple data streams in parallel within a coprocessor 120 and/or multiple coprocessors 120. The multiple data streams are handled by independent functional units, referred to as pipelines, within a coprocessor, and a coprocessor 120 may have up to 32 such pipelines or more. In embodiments in which a coprocessor has multiple pipelines, the service and control processor 140 may multiplex a number of independent data streams onto the physical channels 142 for processing within the coprocessors 120. In an embodiment, there is a one to one correspondence between the number of logical data streams and the number of pipelines in a coprocessor.

In the protein molecular docking example, each conformation of a ligand molecule generated by a rotation or translation of the molecule is handled by the system as an independent logical data stream. In an embodiment, the service and control processor 140 transports as many such logical data streams to a coprocessor 120 as there are computational pipelines within that coprocessor. For example, if each coprocessor 120 has 8 pipelines, and there are four coprocessors 120 in the system, the control processor 140 may transport 32 logical data streams to the coprocessors in parallel. This is then equivalent to analyzing 32 conformations simultaneously.

In an embodiment, logical data streams are classified as either data dependent or data independent. Data dependent streams are typically output streams that are generated via processing of other streams, or are streams that need to be processed in a certain specific order.

In an embodiment, a data stream scheduling table captures the application flow in the system 100. The scheduling table uses a data stream capability table to determine the configuration or capability of each processor. Examples of a scheduling table 1110 and a capability table 1120 are illustrated in FIGS. 11a and 11b. The service and control processor 140 uses the scheduling table to manage the flow of data between the memory 170 and the coprocessors 120. To schedule streams for processing, the service and control processor 140 sequentially reads the scheduling table. The service and control processor 140 must first check to see if an operation can be scheduled by reading the capability table. For example, in FIG. 11a, the operation for data stream A is a summing operation. The service and control processor 140 then checks the capability table to determine the coprocessors 120 that may be configured to sum data. As FIG. 11b indicates in this example, coprocessor ids 1, 2, 3, and 4 may be configured to sum data. The service and control processor 140 also verifies the availability of any particular coprocessor 120, which it can easily do since all coprocessor operations pass through and are scheduled by the service and control processor. If a particular coprocessor is available, the service and control processor then configures that coprocessor for a summing operation, using the configuration data (i.e., personality module) stored at the address location identified by the Map Structure Address 1122. The service and control processor 140 also marks the data streams and the coprocessors as being in a Busy state. After the coprocessor is configured, the service and control processor 140 streams the data to the coprocessor 120. After the coprocessor has completed the operation, it sends an acknowledgement to the service and control processor, and the service and control processor marks the data streams and coprocessor as available one again.

In this manner, the service and control processor 140 is able to control data dependent operations on streams by controlling the order in which streams are entered into the Scheduling table. The service and control processor can also enforce strict stream processing order between dependent data streams. The service and control processor in this manner, can further schedule as many operations, on as many data streams, on as many coprocessors as are available.

Figure 8:
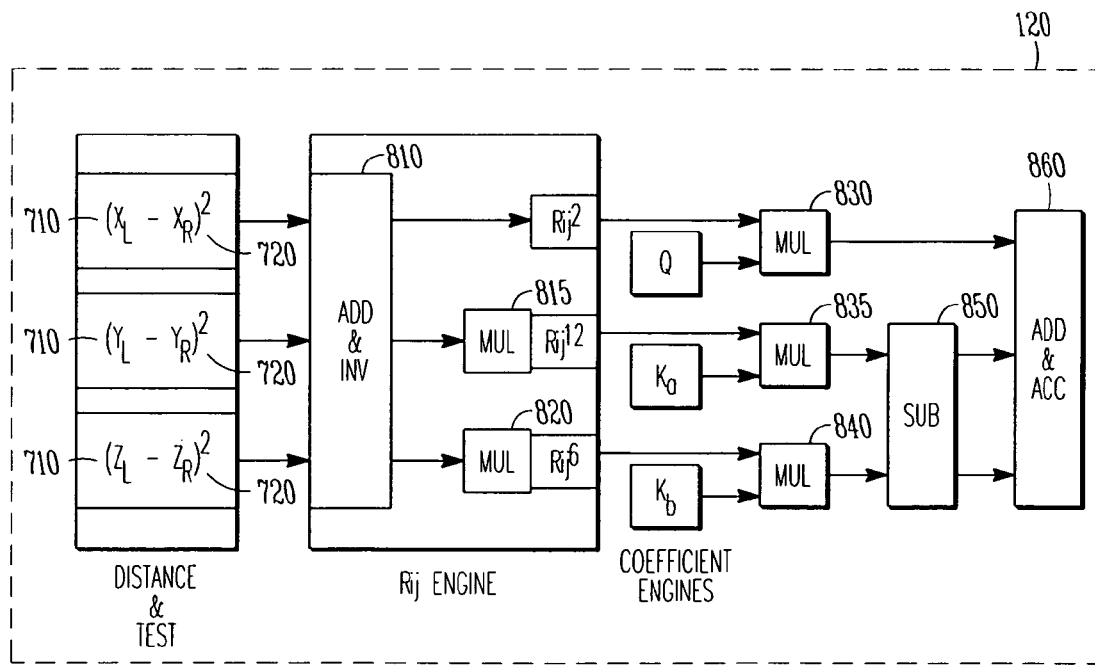
FIG. 8 illustrates an embodiment of a coprocessor configured to calculate the intermolecular energies between a receptor and a ligand.

FIG. 8 illustrates in detail an embodiment of a coprocessor 120 configured for the calculation of the intermolecular energies of this protein docking example. In this embodiment, after a set of ligand and receptor coordinates (710 and 720) are streamed from the memory 170 to the coprocessor 120, the differences between the X, Y, and Z coordinates of the receptor atoms and the ligand atoms in a particular configuration are determined. These differences are squared, then summed at adder and inverter 810. This addition and inversion results in the $R_{ij}^x$ value. The output of the adder and inverter 810 is input to multipliers 815 and 820, and the output of these multipliers results in $R_{ij}^{12}$ and $R_{ij}^6$ respectively. The next stage of the coprocessor configuration performs the actual calculation of the intermolecular energy E. Referring again to FIG. 8, $R_{ij}^2$ and the $Q_iQ_j$ term are multiplied at 830 to calculate the $\Sigma Q_iQ_j/R_{ij}^2$ term in the intermolecular energy equation. $R_{ij}^{12}$ is multiplied with the value of $K_a$ at 835 to calculate the $K_a^{12}/R_{ij}^{12}$ term, and $R_{ij}^6$ is multiplied with $K_b$ at 840 to calculate the $K_b^6/R_{ij}^6$ term. Then, as illustrated in FIG. 8, the output from multiplier 835 and multiplier 840 are input into gates 850 configured to subtract the results (i.e., $K_a^{12}/R_{ij}^{12} - K_b^6/R_{ij}^6$) As a final step, the output of the subtraction gate 850 and multiplier 830 are input into adder and accumulator 860 to calculate the intermolecular energy (i.e., $E = \Sigma (K_a^{12}/R_{ij}^{12} - K_b^6/R_{ij}^6) + \Sigma Q_iQ_j/R_{ij}^2$) for the particular receptor atom and ligand atom pair that is being processed.

The algorithm 400 executing on the system 100 calculates the intermolecular interaction of each ligand conformation for a given active receptor site. The energy values that are below a threshold are stored along with the information on the coordinate values representing a particular orientation of the ligand. In an embodiment, the lowest energy values typically represent the most favorable binding of a ligand to a receptor.

The foregoing protein binding embodiment is just one illustration of the application of a heterogeneous system such as that illustrated in FIG. 1 to a computationally intensive problem. Embodiments of the invention could be applied to any other such computationally intensive problems, especially ones similar to protein docking wherein somewhat reasonable sets of data (e.g., 20 to 40 atoms in a ligand and 2000 to 4000 atoms in a receptor) explode into a very difficult to manage data set through all the possible combinations of the two data sets.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A system comprising:
    a processor;
    a set of first coprocessors;
    a memory;
    a second coprocessor coupled to said set of first coprocessors;
    a system and memory controller coupled to said processor and said memory;
    a system interconnect coupled to said system and memory controller and said second coprocessor;
    a broadband data path coupling said memory to said second coprocessor; and
    a high speed link coupling said second coprocessor to said set of first coprocessors;
    wherein one or more of said processor and said second coprocessor are configured to analyze software code that processes molecular data to determine bottlenecks in the software code;
    wherein one or more of said processor and said second coprocessor are configured to manipulate said molecular data by rotating and translating said molecular data; and
    wherein said second coprocessor is configured to schedule processing of said software code and said molecular data in a particular first coprocessor based on said analyses of said software code and said molecular data, and based on the type of data that the particular first coprocessor is configured to process.

2. The system of claim 1, wherein said high speed link comprises a serial link.

3. The system of claim 1, wherein said first coprocessor comprises a field programmable gate array.

4. The system of claim 3, wherein said first coprocessor is configured as a vector coprocessor.

5. The system of claim 1, wherein said memory comprises a Double Data Rate Synchronous Dynamic Random Access Memory (DDR SDRAM).

6. The system of claim 1, wherein said processor is selected from the group consisting of a 32 bit processor and a 64 bit processor.

7. The system of claim 1, wherein said second coprocessor is a field programmable gate array, and further wherein said second coprocessor functions as a service and control coprocessor.

8. The system of claim 1, wherein said system interconnect is coupled to said system and memory controller and said second coprocessor by a 128 bit high speed link.

9. The system of claim 1, wherein said second coprocessor fetches data from said memory via said broadband path, and further wherein said second coprocessor streams said data to said first coprocessor over said high speed serial link.

10. The system of claim 1, further comprising:
    a backplane interface: and
    a user interface;
    wherein said backplane interface couples said user interface to said second coprocessor.

11. The system of claim 10, wherein said user interface comprises a personal computer.

12. The system of claim 10, wherein said user interface comprises a high speed Ethernet link.

13. The system of claim 1, wherein said first coprocessor is coupled to an advanced mezzanine card.

14. The system of claim 1, further comprising a plurality of processors and a plurality of first coprocessors.

15. The system of claim 1, wherein said first coprocessor is selected from the group consisting of a specialized coprocessor configured as a field programmable gate array, an application specific integrated circuit, a floating point processor, a digital signal processor, a field programmable object array, a cell processor, or a graphics processing unit;
- a controller and interface coprocessor coupled to said specialized coprocessor; and
- a coprocessor dedicated memory.

16. The system of claim 1, wherein said first coprocessor is configured to calculate intermolecular energies between atoms of a receptor molecule and atoms of a ligand molecule.

17. The system of claim 16, wherein said first coprocessor configuration comprises:
- a first set of gates configured for determining a difference between coordinates of said receptor atoms and coordinates of said ligand atoms, and further for squaring said differences;
- a second set of gates coupled to said first set of gates, said second set of gates configured for summing said squared differences, and further for calculating the square root of said summed squared differences;
- a third set of gates coupled to said second set of gates, said third set of gates for dividing one or more energy coefficients by the output of said second gates;
- a fourth set of gates coupled to said second set of gates, said fourth set of gates for dividing an electrostatic interaction between said receptor atoms and said ligand atoms by the output of said second set of gates;
- a fifth set of gates coupled to said third set of gates, said fifth set of gates for determining a difference between output of said third set of gates; and
- a sixth set of gates coupled to said fourth set of gates and said fifth set of gates, said sixth set of gates for accumulating output from said fourth set of gates and said fifth set of gates.

18. The system of claim 9, further comprising a scheduling table and a capability table.

19. The system of claim 18, wherein said streaming of data comprises:
- partitioning said data into input streams;
- storing in said scheduling table the location of each of said input streams, the operation to be performed on each of said input streams, an output data stream associated with each of said input streams, and an order to process said input streams;
- storing into said capability table one or more operations to be performed on said input streams, coprocessors capable of being configured to perform said one or more operations, the number of pipelines per coprocessor, and a location where configuration data to perform said one or more operations are stored;
- configuring one or more coprocessors based on said configuration data; and
- transferring an input data stream to one or more coprocessors based on the contents of said scheduling table and said capability table.

20. The system of claim 19, wherein said streaming of data further comprises:
- partitioning one or more of said input streams into a plurality of input streams;
- transferring said plurality of input streams to a plurality of pipelines in a plurality of coprocessors.

21. The system of claim 16, wherein a first energy coefficient comprises a Van der Waals force.

22. The system of claim 16, wherein a second energy coefficient comprises an electrostatic force.

23. The system of claim 16, wherein said intermolecular energy is calculated for all combinations of said receptor atoms and said ligand atoms.

24. The system of claim 1, wherein said first coprocessor is a commercially available specially configured integrated circuit, and further wherein said second coprocessor manipulates said data into a format that is compatible with said commercially available specially configured integrated circuit.

25. The system of claim 1, wherein the word length of said first coprocessor is variably configurable to a range of 1 to 64 inclusive.

26. The system of claim 17, wherein said intermolecular energy calculation comprises:

$$E = \sum_{i<j}(K_a^{12}/R_{ij}^{12} - K_b^6/R_{ij}^6) + \sum_{i<j} Q_i Q_j / R_{ij}^2$$

wherein
$R_{ij}^x = ((X_L - X_R)^2 + (Y_L - Y_R)^2 + (Z_L - Z_R)^2)^{1/2}$;
$Q_i Q_j$ is the electrostatic interaction between two atoms;
$K_a$ and $K_b$ are energy coefficients;
$X_L, Y_L$, and $Z_L$ are coordinates for said ligand atom;
$X_R, Y_R$, and $Z_R$ are coordinates for said receptor atom;
i comprises the number of atoms in said receptor molecule; and
j comprises the number of atoms in said ligand molecule.

27. The system of claim 1, wherein
said molecular data comprises molecular structures; and
and said manipulation comprises transforming said molecular structures into a set of distances between atoms in said molecular structures.

28. The system of claim 27, wherein said manipulation comprises a rotation and a translation of said molecular structures.

29. The system of claim 27, wherein said second coprocessor schedules said set of distances for processing in a particular first coprocessor.

30. The system of claim 29, wherein said particular first coprocessor comprises a field programmable gate array.

31. The system of claim 29, wherein said particular first coprocessor comprises a graphics processing unit.

32. The system of claim 31, wherein said data manipulation comprises altering said molecular structure into data for processing by the graphics processing unit.

33. The system of claim 32, wherein said data for processing by the graphics processing unit is configured as pixel-based data.

34. The system of claim 1, wherein said set of first coprocessors is reconfigurable as a function of the data.

35. The system of claim 1, wherein one or more of said processor and said second coprocessor are configured to analyze, partition, and map to a particular first coprocessor said molecular data.

36. The system of claim 1, wherein said manipulation is based on the type of data that the particular first coprocessor is configured to process.

37. The system of claim 1, wherein said analysis, partition, and mapping create compatible data streams.

38. A system comprising:
- a first coprocessor;
- a second coprocessor coupled to said first coprocessor and a user interface;
- a system interconnect coupled to said second coprocessor; and a subsystem coupled to said system interconnect, said subsystem for executing application software code relating to molecular data and partitioning the molecular data into input streams to be processed by said first coprocessor;

wherein said second coprocessor is configured to analyze said application software code to determine bottlenecks in the software code;

wherein said second coprocessor is configured to manipulate said molecular data by rotating and translating said molecular data; and wherein said second coprocessor is configured to schedule processing of said software code and said molecular data in said first coprocessor based on said analyses of said software code and said molecular data, and based on the type of data that said first coprocessor is configured to process.

39. The system of claim 38, wherein said subsystem comprises:
   a processor;
   a memory; and
   a system and memory controller.

40. The system of claim 39, wherein said second coprocessor is for streaming said input stream to said first coprocessor.

41. The system of claim 39, wherein said first coprocessor and said processor are connected via a Direct Memory Access engine.

42. The system of claim 39, wherein said system comprises an Advanced Telecommunication Computing Architecture.

43. The system of claim 38, wherein said user interface is a high speed Ethernet link.

44. The system of claim 38, wherein said first coprocessor and said second coprocessor are field programmable gate arrays.

45. The system of claim 44, wherein said first coprocessor is configured based on data to be processed by said first coprocessor.

46. The system of claim 45, wherein said configuration of said first coprocessor is based on the type of said data, the amount of said data, and the operations to be performed on said data.

47. The system of claim 40, wherein said streaming comprises:
   further partitioning said data into a plurality of input streams;
   storing in a first table the location of each of said input streams, the operation to be performed on each of said input streams, an output data stream associated with each of said input streams, and an order to process said input streams;
   storing into a second table one or more operations to be performed on said input streams, coprocessors capable of being configured to perform said one or more operations, the number of pipelines per coprocessor, and a location where configuration data to perform said one or more operations are stored;
   configuring one or more coprocessors based on said configuration data; and
   transferring said plurality of input streams to a plurality of pipelines in a plurality of coprocessors based on the contents of said first table and said second table.

48. A system comprising:
   a plurality of processors;
   a plurality of configured coprocessors;
   a Double Data Rate Synchronous Dynamic Random Access Memory (DDR SDRAM);
   a service and control coprocessor coupled to said plurality of said configured coprocessors;
   a system and memory controller coupled to said plurality of processors and said Double Data Rate Synchronous Dynamic Random Access Memory (DDR SDRAM); and
   a system interconnect coupled to said system and memory controller and said service and control processor;
   wherein said plurality of processors is configured to analyze software code that processes molecular data to determine bottlenecks in the software code;
   wherein said plurality of processors is configured to manipulate said molecular data by rotating and translating said molecular data; and
   wherein said service and control coprocessor is configured to schedule processing of said software code and said molecular data in said plurality of configured coprocessors based on said analyses of said software code and said molecular data, and based on the type of data that said plurality of configured coprocessors is configured to process.

* * * * *